United States Patent
Ikeya et al.

(10) Patent No.: US 7,837,777 B2
(45) Date of Patent: Nov. 23, 2010

(54) METALLIC PIGMENT COMPOSITION AND UV METALLIC INK COMPOSITION OR UV METALLIC COATING COMPOSITION USING THE SAME

(75) Inventors: Akihiko Ikeya, Osaka (JP); Yoshikazu Inoue, Osaka (JP)

(73) Assignee: Toyo Aluminium Kabushiki Kaisha, Osaka-Shi (JP)

(*) Notice: Subject to any disclaimer, the term of this patent is extended or adjusted under 35 U.S.C. 154(b) by 665 days.

(21) Appl. No.: 10/589,664

(22) PCT Filed: Feb. 7, 2005

(86) PCT No.: PCT/JP2005/001743
§ 371 (c)(1),
(2), (4) Date: Aug. 16, 2006

(87) PCT Pub. No.: WO2005/090487
PCT Pub. Date: Sep. 29, 2005

(65) Prior Publication Data
US 2008/0216706 A1 Sep. 11, 2008

(30) Foreign Application Priority Data
Mar. 24, 2004 (JP) .............................. 2004-086345

(51) Int. Cl.
*C09D 11/00* (2006.01)
*C09C 1/62* (2006.01)
*C09C 1/00* (2006.01)
*C08K 5/00* (2006.01)

(52) U.S. Cl. .................. 106/31.75; 106/403; 106/404; 106/415; 106/499

(58) Field of Classification Search .............. 106/31.75, 106/404, 415, 447, 491, 493, 503, 403, 499
See application file for complete search history.

(56) References Cited

U.S. PATENT DOCUMENTS

| | | | | |
|---|---|---|---|---|
| 3,878,139 A | * | 4/1975 | Takahashi et al. | ............ 527/314 |
| 5,011,533 A | * | 4/1991 | Kuwajima et al. | ........... 106/404 |
| 5,830,446 A | * | 11/1998 | Berthiaume et al. | ......... 424/70.1 |
| 6,270,563 B1 | * | 8/2001 | Herget et al. | ................. 106/415 |
| 2004/0024078 A1 | * | 2/2004 | Itoh et al. | ....................... 522/1 |

FOREIGN PATENT DOCUMENTS

| CN | 1093155 C | 10/2002 |
|---|---|---|
| JP | 1-198668 A | 8/1989 |
| JP | 2002-196675 A | 7/2002 |
| JP | 2002-226780 A | 8/2002 |
| JP | 2002-249697 A | 9/2002 |
| JP | 2003-82290 A | 3/2003 |
| JP | 2003-268402 A | 9/2003 |
| WO | WO-96/38506 A1 | 12/1996 |
| WO | WO-02/062894 A1 | 8/2002 |

OTHER PUBLICATIONS

A. II. Zacojacofu, "Nitrocellulose", Edition 1, p. 301, National Defence Press, Jun. 1956.

* cited by examiner

*Primary Examiner*—Anthony J Green
*Assistant Examiner*—Pegah Parvini
(74) *Attorney, Agent, or Firm*—Birch, Stewart, Kolasch & Birch, LLP

(57) ABSTRACT

The invention provides a metallic pigment composition capable of preventing gelation of a UV metallic ink or a UV metallic coating material containing an ultraviolet-curable resin and providing good metallic effect and the stability with lapse of time and a UV metallic ink composition and a UV metallic coating material composition using it. The metallic pigment composition contains metal flakes and a nitrocellulose as essential components and the nitrocellulose is contained at a ratio in a range of 0.1 to 12 parts by mass to the metal flakes 100 parts by mass. The UV metallic ink and a UV metallic coating material are provided by adding the metallic pigment composition. The surfaces of the metal flakes are preferable to be coated with a phosphorus compound.

5 Claims, No Drawings

METALLIC PIGMENT COMPOSITION AND UV METALLIC INK COMPOSITION OR UV METALLIC COATING COMPOSITION USING THE SAME

TECHNICAL FIELD

The invention relates specially to a metallic pigment composition capable of improving the stability of a UV metallic ink and a UV metallic coating material using an ultraviolet curable resin with lapse of time and giving good metallic effect by addition to the UV metallic ink and the UV metallic coating material, as well as a UV metallic ink composition and a UV metallic coating composition.

BACKGROUND ART

With respect to so-called metallic inks and metallic coating materials containing flake pigments of aluminum, copper and their alloys, various kinds of resins are used as a binder and in recent years, so-called UV metallic inks and UV metallic coating materials using ultraviolet curable resins advantageous in the quick curability, low-pollution, and energy saving property have been investigated. However the metals, which are the flake pigments, in the UV metallic inks and UV metallic coating materials promote the initiation of polymerization of the monomers or oligomers existing in the ultraviolet curable resins, so that there occurs a problem that gelation of the inks and coating materials occurs within a short time during the storage period. Further, articles printed or coated by the inks and coating materials tend to lose the metallic luster of the ink films and the coating films owing to the oxidation of the metal flakes with the lapse of time.

To solve such problems, Patent Document No. 1 discloses a metal powder-containing active beam-curable ink obtained by adding a nitrocellulose with a low polymerization degree to an active energy beam-curable ink containing a metal powder.

However, the method requires to increase the addition amount of the nitrocellulose to be added so as to achieve a satisfactory result in terms of the number of days taken until gelation of the inks and coating materials and therefore, the viscosity of the inks and coating materials tends to increase and the adhesion property of ink films or coating films tends to be deteriorated. Further, in order to assure the uniform dispersion of the nitrocellulose in the inks and coating materials, the stirring duration at the time of ink and coating material production is so prolonged that an excess shear force is applied to the metal flakes and subsequently deterioration of the metallic effect may possibly be deteriorated owing to deformation of the flakes themselves. Further, with respect to deterioration of the stability with the lapse of time and metallic luster of the ink films or coating films, even if the nitrocellulose is added more, the effect of the increase of addition to improve these properties is limited.

Patent Document No. 1: Japanese Patent Laying-Open No. 2002-249697

DISCLOSURE OF THE INVENTION

Problems to be Solved by the Invention

The invention aims to solve the above-mentioned problems and provide a metallic pigment composition capable of preventing gelation of a UV metallic ink and UV metallic coating material using a ultraviolet curable resin and preventing deterioration of metallic luster of an ink film and a coating film with the lapse of time after printing or film formation and a UV metallic ink composition and a UV metallic coating composition using the metallic pigment composition.

Means for Solving the Problems

The invention relates to a metallic pigment composition containing a metal flake and a nitrocellulose at a ratio in a range of the nitrocellulose 0.1 to 12 parts by mass to the metal flake 100 parts by mass.

In the invention, the surfaces of the metal flakes are preferable to be coated with a phosphorus compound.

The invention also relates to a UV metallic ink composition or a UV metallic coating composition using the metallic pigment composition containing the metal flake and the nitrocellulose at a ratio in a range of the nitrocellulose 0.1 to 12 parts by mass to metal flakes 100 parts by mass.

EFFECTS OF THE INVENTION

According to the invention, addition of the nitrocellulose to a metallic pigment composition containing metal flakes itself makes it possible to maintain stability with the lapse of time without deterioration of metallic effect in the case the metallic pigment composition is added to the UV metallic ink and the UV metallic coating material.

BEST MODES FOR CARRYING OUT THE INVENTION

The invention will be more readily apparent from the following detailed description. However, it is not intended that the present invention be limited to the illustrated embodiments.

<Metallic Pigment Composition>

A metallic pigment composition of the invention is characterized in that the composition contains metal flakes and the nitrocellulose. The metallic pigment composition of the invention is preferably in the form of a paste.

In the case the metallic pigment composition of the invention is in the form of a paste, the paste contains an organic solvent and a grinding aid as well as a solvent and/or a diluent capable of dissolving the nitrocellulose besides the metal flakes and the nitrocellulose. Also, the composition may further contain a fatty acid, a phosphorus compound, and an aliphatic amine for coating the surfaces of metal flakes.

(Metal Flakes)

The metal flakes to be used in the invention may include flakes of materials containing metals such as aluminum, zinc, copper, silver, nickel, titanium, and stainless steel and flakes of alloys of these metals. Among these flakes, aluminum flakes, copper flakes and bronze flakes of copper and zinc alloys are excellent in the metal luster and economical and in addition, have a relatively low specific gravity to make handling easy and accordingly they are particularly preferable.

The average particle size of the metal flakes is preferably in a range of 1 to 100 μm and more preferably in a range of 3 to 60 μm. If the average particle size of the metal flakes is 1 μm or larger, the metallic effect or the brightness is good. On the other hand, if the average particle size of the metal flakes is 100 μm or smaller, the metal flakes are prevented from extruding out of the surface of an ink film or a coating film and thus the risk of deterioration of the surface smoothness or the clearly reflecting property is low.

The average thickness of the metal flakes is preferably in a range of 0.01 to 5 μm and more preferably in a range of 0.02 to 2 µm. If the average thickness of the metal flakes is 0.01 µm or thicker, the metal flakes have sufficient strength and therefore, the processibility during the production process is good. If the average thickness of the metal flakes is 5 µm or thinner, the risk of deterioration of the surface smoothness or the clearly reflecting property is low and additionally, it is advantageous from a viewpoint of the production cost.

The average particle size of the metal flakes can be measured by calculating the average volume from the particle size distribution measured by a conventionally known particle size distribution measurement method such as laser diffraction method, a micromesh sieve method, a Coulter counter method, or the like. The average thickness can be calculated from the shielding power and the density of the metal flakes.

The above-mentioned metal flakes can generally be obtained by making a metal powder flaky by wet grinding a raw material metal powder and a grinding aid in an organic solvent by a grinding apparatus having a grinding media such as a ball mill or an attritor. The grinding aid has an effect to inhibit unneeded oxidation of the surfaces of the metal flakes and improve the luster. The grinding aid is not particularly limited and conventionally known ones can be used and for example, fatty acids such as oleic acid and stearic acid; aliphatic amines, aliphatic amides, aliphatic alcohols, and ester compounds are preferably usable.

The addition amount of the grinding aid is preferably in a range of 0.1 to 20 parts by mass and more preferably in a range of 0.5 to 10 parts by mass to the metal powder, a raw material, 100 parts by mass. In the case the addition amount of the grinding aid is 0.1 part by mass or more, the metal flakes are hardly agglomerated in the metallic pigment composition and the risk of deterioration of the surface luster of the metal flakes themselves is low. In the case the addition amount of the grinding aid is 20 parts by mass or less, the physical properties are hardly deteriorated in the case of using the metal flakes for ink and coating materials.

The organic solvent to be used for grinding the metal powder and the grinding aid is not particularly limited and conventionally known solvents may be used and for example, hydrocarbon type solvents such as mineral spirit and solvent naphtha and alcohol type, ether type, or ester type solvents can be used. In general, in consideration of a problem regarding safety such as ignition of the solvent at the time of grinding, high boiling point hydrocarbon solvents are used preferably. After grinding, the object to be ground is filtered through a screen for coarse powder removal and then the organic solvent and the metal flakes are separated by solid-liquid separation using a filter press or the like thereafter to obtain a metal flake paste containing about 50 to 80% by mass of the metal. It is more preferable that the content of the organic solvent in the metal flake paste is as low as possible in terms of fast curability of an ink film and a coating film.

(Nitrocellulose)

In the metallic pigment composition of the invention, the nitrocellulose is contained at a ratio preferably in a range of 0.1 to 12 parts by mass and more preferably in a range of 1.0 to 8.0 parts by mass to the metal flakes 100 parts by mass. If the content of the nitrocellulose is 0.1 part by mass or more, the stability of the metallic pigment composition with the lapse of time is good and also the stability of the ink and the coating material with the lapse of time is good in the case it is used for the ink and the coating material. If the content of the nitrocellulose is 12 parts by mass or less, the adhesion property of the ink film and the coating film can be maintained and at the same time the viscosity increase is prevented to make production of an ink and a coating material easy. Since the nitrocellulose is possible to be ignited and explode even by electrostatic discharge when it is handled in dry state, it is preferable to use the nitrocellulose in the state that the nitrocellulose is dissolved in a solvent or a diluent. Also for uniform dispersion in a metallic pigment paste, cellulose is preferable to be used while being dissolved in a solvent or a diluent.

Examples of the solvent to be used for dissolving the nitrocellulose therein are esters such as ethyl acetate, butyl acetate, amyl acetate, and ethyl lactate; ketones such as acetone, ethyl methyl ketone, isobutyl methyl ketone, diacetone alcohol, and cyclohexanone; ethers such as cellosolve and butyl cellosolve; alcohols such as methyl alcohol, ethyl alcohol, and butyl alcohol; and petroleum-derivatives such as benzene, toluene, xylene, and solvent naphtha. Also examples of the diluent to be used are phthalic acid compounds and monomer components capable of dissolving the nitrocellulose with a low viscosity.

Examples of the phthalic acid compound are phthalic acid monomethyl ester, phthalic acid monoethyl ester, phthalic acid monophenyl ester, phthalic acid monobenzyl ester, phthalic acid monocyclohexyl ester, phthalic acid dimethyl ester, phthalic acid diethyl ester, phthalic acid methyl ethyl ester, phthalic acid dibutyl ester, phthalic acid dioctyl ester, phthalic acid dihexadecyl ester, phthalic acid dicyclohexyl ester, phthalic acid diphenyl ester, phthalic acid di-α-naphthyl ester, and phthalic acid dibenzyl ester. Examples of the monomer component are monofunctional monomers such as 2-ethylhexyl acrylate, 2-hydroxyethyl acrylate, 2-hydroxypropyl acrylate, 2-hydroxyethylacryloyl phosphate, tetrahydrofurfuryl acrylate, and tetrahydrofurfuryl acrylate derivatives; bifunctional monomers such as dicyclopentenyl acrylate, dicyclopentenyloxyethyl acrylate, 1,3-butanediol diacrylate, 1,4-butanediol diacrylate, 1,6-hexanediold diacrylate, diethylene glycol diacrylate, neopentyl glycol diacrylate, hydroxypivalic acid ester neopentyl glycol diacrylate, and tripropylene glycol diacrylate; and trifunctional monomers such as trimethylol propane triacrylate, pentaerythritol triacrylate, and dipentaerythritol hexacrylate.

In the case a phthalic acid compound is added as a diluent, the effect to improve the adhesion property of the ink film and the coating film is also provided.

The addition ratios and addition amounts of the solvent and the diluent can be changed in accordance with the desired ink properties and coating material properties and most of solvents or diluents to dissolve the nitrocellulose tend to deteriorate the stability of the metallic pigment paste with the lapse of time even with a small amount and if the amount of the nitrocellulose to be added is small, the tendency becomes more apparent. In the invention, the nitrocellulose is not added at the time of production of the ink or the coating material but added to the metallic pigment composition, so that the solvent and/or the diluent of the nitrocellulose exists in the metallic pigment composition for a long time. Therefore, in the case the addition amount of the nitrocellulose is small, the amount of the solvent or the diluent is preferably as small as possible in terms of the stability of the metallic pigment composition with the lapse of time and the fast curability of the ink film and the coating film.

The nitrocellulose is preferable to have an average polymerization degree of 30 to 150 and a nitrogen amount of 10.7 to 12.2% (% by mass of nitrogen) in form of an industrial product and more preferable to have an average polymerization degree of 35 to 55 and a nitrogen amount of 11.4 to 12.2%. In the case the average polymerization degree is higher than 150 or the nitrogen amount is higher than 12.2%, the nitrocellulose tends to be difficult to be solved in the diluent and on the contrary, in the case the average polymerization degree is lower than 30 or the nitrogen amount is lower than 10.7%, the stability with the lapse of time tends to be lowered. The nitrocellulose is preferably those with a low viscosity of ¼ second or shorter and more preferably those with a low viscosity of 1/10 second or shorter by the Hercules Powder Co. viscosity measurement method. Those having ¼ second or higher viscosity tend to be difficult to be dissolved in the diluent. Hereinafter, the viscosity measurement method will be described.

Viscosity Measurement Method of Hercules Powder Co.

A mixed solution of nitrocellulose 12.2 wt. %, ethanol with 95% purity 22.0 wt. %, ethyl acetate with 99% purity 17.5 wt. %, and benzene 48.3 wt. % is put in a tube with an inner diameter of 1 inch and a length of 14 inches and the time taken for a steel ball with 5/16 inch to pass 10 inch distance at 25° C. is measured.

(Surface Treatment Agent)

The surfaces of the metal flakes to be used in the invention generally absorb the grinding aid added at the time of grinding and in the case surface treatment for adsorbing a fatty acid, a phosphorus compound, an aliphatic amine or the like other than the grinding aid, the stability of the metallic pigment composition with the lapse of time can be improved and also it contributes to improvement of the color tone of the ink film or the coating film and therefore, it is preferable. Especially, in the case a phosphorus compound is used, the effect to improve the stability with the lapse of time and the effect to improve the color tone are particularly significant. The addition amount of the fatty acid, the phosphorus compound, the aliphatic amine or the like to be added as a surface treatment agent is preferably in a range of 0.01 to 10 parts by mass to the metal flakes 100 parts by mass. In the case the addition amount of the surface treatment agent is 0.01 part by mass or higher, a sufficient surface treatment effect can be achieved and in the case it is 10 parts by mass or lower, the risk of deterioration of the adhesion property and the curability of the ink film and the coating film is lowered.

Representative examples of the fatty acid are higher fatty acids such as dodecyl (lauryl) acid, tetradecyl (myristyl) acid, octadecyl (stearyl) acid, eicosyl (arachyl) acid, docosyl (behenyl) acid, and oleic acid.

Examples of the phosphorus compound to be used are inorganic phosphoric acids such as orthophosphoric acid and organic phosphorus compounds such as stearyl acid phosphate, myristyl acid phosphate, palmityl acid phosphate, lauryl acid phosphate, polyoxyethylene, alkylphenyl ether acid phosphate, n-decyl acid phosphate, 2-ethylhexyl acid phosphate, oleyl acid phosphate, hexyl acid phosphate, butyl acid phosphate, ethylene glycol acid phosphate, mono(2-acryloyloxyethyl) acid phosphate, mono(2-methacryloyloxyethyl) acid phosphate, 2-acryloyloxyethyl acid phosphate, 2-methacryloyloxyethyl acid phosphate, and (2-hydroxyethyl)methacrylate acid phosphate.

Examples of the aliphatic amine to be used are those defined by the general formula $C_nH_{2n+1}-NH_2$ or $C_nH_{2n-1}-NH_2$ such as dodecylamino, tetradecylamine, hexadecylamine, octadecylamine, and oleylamine. In the formulas, n is preferable in a range of 12 to 22.

<Production Method of Metallic Pigment Composition>

The metallic pigment composition of the invention can be produced by kneading the nitrocellulose with the metal flakes by a high speed mixer such as a kneader mixer, a biaxial screw type kneader, a Henshel mixer, and a super mixer, and a blender.

In this case, as described above, the nitrocellulose is preferable to be used in form of a solution in which the nitrocellulose is dissolved in the solvent or the diluent. Also, the metal flakes are preferable to be used in form of a paste containing about 50 to 80% by mass of the metal. It is preferable for the metal flake paste that the surface treatment agent such as a fatty acid, a phosphorus compound, an aliphatic amine or the like for coating the surfaces of the metal flakes is previously added and kneaded similarly by a high speed mixer and a blender before the nitrocellulose is mixed and kneaded, or the surface treatment agent may be added at the same time when the nitrocellulose is added and kneaded. The temperature of the kneading is preferably a room temperature or higher and 50° C. or lower and the duration of the kneading is preferably 10 to 60 minutes. If the temperature of the kneading is a room temperature or higher and 50° C. or lower, the mixing can be carried out excellently without causing excess increase of the viscosity of the monomer component added as a diluent for the nitrocellulose and the risk of reaction of the monomer component is low. If the duration of the kneading is 10 minutes or longer, the kneading is sufficiently carried out to avoid treatment unevenness and if the duration of the kneading is 60 minutes or shorter, the risk of deterioration of the color tone owing to deformation of metal flakes is low.

<UV Metallic Ink Composition and UV Metallic Coating Composition>

The metallic pigment composition of the invention is employed to the UV metallic ink composition or UV metallic coating composition using an ultraviolet curable resin. It is preferable that the metallic pigment composition of the invention is added to the UV metallic ink composition or the UV metallic coating composition in an amount proper to adjust the metal flake amount to be in a range of 0.1 to 30% by mass. If the metal flake amount is 0.1% by mass or more, a sufficient decorative (metallic) effect can be caused and if it is 30% by mass or less, the risk of an adverse effect on the physical property, weathering resistance, corrosion resistance, and mechanical strength of the UV metallic ink composition or UV metallic coating composition is low.

The ultraviolet curable resin to be used as a binder resin of the UV metallic ink composition or UV metallic coating composition indispensably contains a reactive monomer and a reactive oligomer and may contain polymers. A solvent is not needed, however it may be contained if a little amount.

As the reactive monomer are usable the monofunctional, bifunctional, and trifunctional monomers exemplified above as the diluent for the nitrocellulose. As the reactive oligomer are usable polyester acrylates, epoxy acrylates, urethane acrylates, and polyether acrylates.

The UV metallic ink composition or the UV metallic coating composition may contain, if necessary, an organic pigment such as Quinacridone red, Phthalocyanine blue, Phthalocyanine green, Isoindolinone yellow, Carbon black, Perylene, and Azo lake; an inorganic pigment such as iron oxide, titanium oxide, cobalt blue, zinc flower, ultramarine, chromium oxide, mica, and chrome yellow; a tackifier, an antistatic agent, a dispersant, an antioxidant, a glazing agent, a surfactant, a synthetic preserver, a lubricant, a filler (a strengthening agent), and a wax.

Conventionally known printing methods may be employed as a printing method of the UV metallic ink and the method may include an engraved printing such as gravure printing; off-set printing (transfer printing), screen printing, and other relief printing, and lithographic printing.

As a method of applying the UV metallic coating material may be employed a brush coating method, a spraying method, and also a coating method using a doctor blade, a roll coater, a bar coater, and the like.

<Effects>

The UV metallic ink or the UV metallic coating material produced using the metallic pigment composition of the invention to which the nitrocellulose is previously added is excellent in the stability with the lapse of time and the color tone as compared a UV metallic ink or a UV metallic coating material to which the nitrocellulose is directly added at the time of blending the UV metallic ink or the UV metallic coating material. Although the reason is not apparent, it may be supposed to be one of possible reasons that in the case of direct addition at the time of blending the ink or the coating material, a large portion of the nitrocellulose added exists as a component in the ink or the coating material, however the amount of the nitrocellulose effectively adsorbed on the metal flakes is low, whereas in the case the nitrocellulose is added to the metal flake paste, the amount of the nitrocellulose effectively adsorbed on the metal flakes is increased. It is also supposed to be another possible reason that the adsorbed nitrocellulose is not easily dissolved in the ultraviolet curable resin at the time of production method of the ink or the coating material.

On the other hand, the reason for the improvement of the stability of the metallic pigment composition with the lapse of time and the color tone improvement of the ink film or a coating film, in the case where the surface treatment for adsorbing the surface treatment agent such as a fatty acid, a phosphorus compound, or an aliphatic amine to the surfaces of the metal flakes is carried out, is attributed to that a protection coating film of the surface treatment agent is formed on the metal flake surfaces and therefore the agglomeration of the metal flakes is suppressed.

EXAMPLES

Hereinafter, the invention will be described more in details with reference to Examples, however it is not intended that the invention be limited to the illustrated examples. The term "part" in Examples and Comparative Examples means "part by mass" unless otherwise specified.

Example 1

As a surface treatment agent, butyl acid phosphate 2 parts was added to aluminum metal 100 parts of aluminum paste 0230 M (manufactured by Toyo Aluminum K.K.) and mixed for 30 minutes by a kneader mixer to produce a surface-treated aluminum paste.

A solution obtained by dissolving nitrocellulose 10 parts in 2-hydroxy-3-phenyloxypropyl acrylate 90 parts was added to the obtained surface-treated aluminum paste at a ratio adjusted to be the nitrocellulose content 3 parts to the aluminum metal 100 parts and mixed for 30 minutes by a kneader mixer to obtain an aluminum pigment composition (metal content 55 wt. %). The stability of the obtained aluminum pigment composition with the lapse of time was evaluated by the method described below. The results are shown in Table 1.

Example 2

A solution obtained by dissolving nitrocellulose 10 parts in 2-hydroxy-3-phenyloxypropyl acrylate 90 parts was added to aluminum paste 0230 M (manufactured by Toyo Aluminum K.K.) at a ratio adjusted to be the nitrocellulose content 3 parts to the aluminum metal 100 parts and mixed for 30 minutes by a kneader mixer to obtain an aluminum pigment composition (metal content 55 wt. %). The stability of the obtained aluminum pigment composition with the lapse of time was evaluated by the method described below. The results are shown in Table 1.

Example 3

A solution obtained by dissolving nitrocellulose 10 parts in 2-hydroxy-3-phenyloxypropyl acrylate 90 parts was added to aluminum paste 0230 M (manufactured by Toyo Aluminum K.K.) at a ratio adjusted to be the nitrocellulose content 0.5 part to the aluminum metal 100 parts and mixed for 30 minutes by a kneader mixer to obtain an aluminum pigment composition (metal content 65 wt. %). The stability of the obtained aluminum pigment composition with the lapse of time was evaluated by the method described below. The results are shown in Table 1.

Example 4

A silver ink was obtained by blending the aluminum pigment composition of Example 1 as follows and the stability with the lapse of time and the surface luster retention ratio were evaluated by the following methods. The results are shown in Table 1.

(Blending)

30 parts: the aluminum pigment composition produced in Example 1;

40 parts: rosin-modified urethane acrylate;

20 parts: trimethylolpropane triacrylate;

10 parts: 2-hydroxy-2-methyl-1-phenylpropan-1-one;

0.05 part: triphenylphosphine; and 0.05 part: hydroquinone monomethyl ether.

Example 5

A silver ink was obtained in the same blending as in Example 4 except that the aluminum pigment composition of Example 2 was blended and the stability with the lapse of time and the surface luster retention ratio were evaluated by the following methods. The results are shown in Table 1.

Example 6

A silver coating material was obtained by blending the aluminum pigment composition of Example 1 as follows and the stability with the lapse of time and the surface luster retention ratio were evaluated by the following methods. The results are shown in Table 1.

(Blending)

18 parts: the aluminum pigment composition produced in Example 1;

20 parts: rosin-modified urethane acrylate;

65 parts: trimethylolpropane triacrylate;

10 parts: 2-hydroxy-2-methyl-1-phenylpropan-1-one;

0.05 part: triphenylphosphine; and 0.05 part: hydroquinone monomethyl ether.

Example 7

A silver ink was obtained by blending the aluminum pigment composition of Example 3 as follows and the stability with the lapse of time and the surface luster retention ratio were evaluated by the following methods. The results are shown in Table 1.

(Blending)

25 parts: the aluminum pigment composition produced in Example 3;

40 parts: rosin-modified urethane acrylate;

20 parts: trimethylolpropane triacrylate;

10 parts: 2-hydroxy-2-methyl-1-phenylpropan-1-one;

0.05 part: triphenylphosphine; and 0.05 part: hydroquinone monomethyl ether.

Comparative Example 1

A solution obtained by dissolving nitrocellulose 20 parts in 2-hydroxy-3-phenyloxypropyl acrylate 80 parts was added to aluminum paste 0230 M (manufactured by Toyo Aluminum K.K.) at a ratio adjusted to be the nitrocellulose content 15 parts to the aluminum metal 100 parts and mixed for 30 minutes by a kneader mixer to obtain an aluminum pigment composition (metal content 47 wt. %). The stability of the obtained aluminum pigment composition with the lapse of time was evaluated by the method described below. The results are shown in Table 1.

Comparative Example 2

A silver ink was obtained by blending the aluminum pigment composition of Comparative Example 1 as follows and the stability with the lapse of time and the surface luster retention ratio were evaluated by the following methods. The results are shown in Table 1.

(Blending)

35 parts: the aluminum pigment composition produced in Comparative Example 1;

40 parts: rosin-modified urethane acrylate, 20 parts: trimethylolpropane triacrylate;

10 parts: 2-hydroxy-2-methyl-1-phenylpropan-1-one;

0.05 part: triphenylphosphine; and 0.05 part: hydroquinone monomethyl ether.

Comparative Example 3

As the aluminum pigment composition was used aluminum paste 0230 M (manufactured by Toyo Aluminum K.K.) and the stability with the lapse of time was evaluated by the method described below. The result is shown in Table 1.

Comparative Example 4

A silver coating material was obtained by blending the aluminum pigment composition of Comparative Example 3 as follows and the stability with the lapse of time and the surface luster retention ratio were evaluated by the following methods. The results are shown in Table 1.

(Blending)

25 parts: the aluminum paste (metal content: 66 wt. %);

40 parts: rosin-modified urethane acrylate;

20 parts: trimethylolpropane triacrylate;

5 parts: 2-hydroxy-3-phenyloxypropyl acrylate;

10 parts: 2-hydroxy-2-methyl-1-phenylpropan-1-one;

0.05 part: triphenylphosphine; and 0.05 part: hydroquinone monomethyl ether.

Comparative Example 5

A silver ink was obtained by blending aluminum paste 0230 M (manufactured by Toyo Aluminum K.K.) as follows and the stability with the lapse of time and the surface luster retention ratio were evaluated by the following methods. The results are shown in Table 1.

(Blending)

25 parts: the aluminum paste (metal content: 66 wt. %);

40 parts: rosin-modified urethane acrylate;

20 parts: trimethylolpropane triacrylate;

5 parts: a solution obtained by dissolving nitrocellulose 10 parts in 2-hydroxy-3-phenyloxypropyl acrylate 90 parts;

0.05 part: triphenylphosphine; and 0.05 part: hydroquinone monomethyl ether.

Comparative Example 6

A silver coating material was obtained by blending aluminum paste 0230 M (manufactured by Toyo Aluminum K.K.) as follows and the stability with the lapse of time and the surface luster retention ratio were evaluated by the following methods. The results are shown in Table 1.

(Blending)

15 parts: the aluminum paste (metal content: 66 wt. %);

20 parts: rosin-modified urethane acrylate;

65 parts: trimethylolpropane triacrylate;

3 parts: a solution obtained by dissolving nitrocellulose 10 parts in 2-hydroxy-3-phenyloxypropyl acrylate 90 parts;

10 parts: 2-hydroxy-2-methyl-1-phenylpropan-1-one;

0.05 part: triphenylphosphine; and 0.05 part: hydroquinone monomethyl ether.

<Evaluation Items and Evaluation Methods>

The aluminum pigment compositions of Examples and Comparative Examples, the aluminum-containing silver inks and the silver coating materials, and ink films and coating films of the inks and coating materials were produced and the following items of them were investigated.

Evaluation Method 1-1: (Stability of the Aluminum Pigment Compositions with the Lapse of Time)

The property alteration of the aluminum pigment compositions of Examples and Comparative Examples was observed with eyes, and observation and evaluated according to the following standard.

A: no alteration for a half of a year:

B: no alteration for two months: and

C: occurrence of agglomeration within one month.

Evaluation Method 1-2: (Stability of Silver Inks and Silver Coating Materials with the Lapse of Time)

The silver inks and silver coating materials produced in Examples and Comparative Examples were held in a thermostat at 50° C. and their property alteration was observed with eyes, and observation and evaluated according to the following standard.

an air spray and dried and cured by a UV radiation apparatus to form coating films. The coating films were subjected to the surface luster measurement by a reflectance meter (tester name: Integral probe type total reflectance meter RM-5; manufactured by Murakami Color Research Laboratory Co., Ltd.) immediately after application and after being left for three months at a room temperature and the alteration (the luster retention ratio) was observed.

Retention ratio(%)=(reflectance after 3 months)/(reflectance immediately after coating)×100

TABLE 1

|  | NC amount to aluminum flakes 100 parts by mass (part by mass) | Stability of aluminum pigment composition with the lapse of time | Stability of silver ink and silver coating material with the lapse of time | Surface luster retention ratio of ink film and coating film | Remarks |
| --- | --- | --- | --- | --- | --- |
| Example 1 | 3 | A | — | — | Phosphoric acid treatment for metal flakes and successive NC addition |
| Example 2 | 3 | B | — | — | NC addition to metal flakes |
| Example 3 | 0.5 | B | — | — | NC addition to metal flakes |
| Example 4 | 3 | — | A | 95% or higher | Ink containing the pigment of Example 1 |
| Example 5 | 3 | — | A | 95% or higher | Ink containing the pigment of Example 2 |
| Example 6 | 3 | — | A | 95% or higher | Coating material containing the pigment of Example 1 |
| Example 7 | 0.5 | — | B | 90% or higher | Ink containing the pigment of Example 3 |
| Comparative Example 1 | 15 | A | — | — | NC addition in an amount exceeding the upper limit to metal flakes |
| Comparative Example 2 | 15 | — | A | Impossible to carry out printing | Ink containing the pigment of Comparative Example 1 |
| Comparative Example 3 | 0 | A | — | — | No NC addition |
| Comparative Example 4 | 0 | — | D | 80% or lower | Ink containing the pigment of Comparative Example 3 |
| Comparative Example 5 | 3 | — | C | 90% or higher | NC addition to the ink |
| Comparative Example 6 | 3 | — | C | 90% or higher | NC addition to the coating material |

A: no alteration for 60 days:

B: no alteration for 30 days:

C: no alteration for 15 days: and

C: occurrence of gelation within 7 days.

Evaluation Method 2-1: (Surface Luster of Ink Films)

The silver inks produced in Examples and Comparative Examples were applied by an RI tester (manufactured by Toyo Seiki Kogyo Co., Ltd.; ink supply condition: 0.3 cc with 3-sectional roll) and dried and cured by a UV radiation apparatus (manufactured by Eyegraphics Co., Ltd.; metal halide lamp 80 W/cm) to form ink films. The ink films were subjected to the surface luster measurement using a reflectance meter (tester name: Integral probe type total reflectance meter RM-5; manufactured by Murakami Color Research Laboratory Co., Ltd.) immediately after application and after being left for three months at a room temperature and the alteration (the luster retention ratio) was observed.

Retention ratio(%)=(reflectance after 3 months)/(reflectance immediately after coating)×100

Evaluation Method 2-2: (Surface Luster of Coating Films)

The silver coating materials produced in the above-mentioned Examples and Comparative Examples were applied by <Evaluation Results>

Being made clear from Table 1, the ink of Comparative Example 5 produced by adding nitrocellulose (NC) at the time of ink production was found effective in the stability of the ink with the lapse of time as compared with nitrocellulose-free ink (Comparative Example 4), however the ink of Example 5 produced by adding nitrocellulose to the metal flakes was found more effective in the stability of the ink with the lapse of time as compared with the ink of Comparative Example 5 and simultaneously found having improved surface luster in the ink film.

In the case of Example 1 in which the metal flakes were surface treated with the phosphorus compound before nitrocellulose addition, the stability of the aluminum pigment composition with the lapse of time was found improved. The stability of the ink of Example 4 film with the lapse of time and the surface luster of the ink using the aluminum pigment composition were both found improved.

Since the stability of the coating film with the lapse of time and the surface luster retention ratio of the coating material of Example 6 were found better than those of Comparative Example 6, so that the effect of the nitrocellulose addition to the aluminum pigment composition was apparent in not only an ink but also a coating material.

While the invention has been described with reference to specific embodiments and examples, the description is illustrative of the invention and is not to be construed as limiting the invention. Various modifications and applications may occur to those skilled in the art without departing from the true spirit and scope of the invention as defined by the appended claims.

INDUSTRIAL APPLICABILITY

The metallic pigment composition of the invention is preferably used particularly for a UV metallic ink or a UV metallic coating material and is capable of maintaining the stability with the lapse of time without deteriorating the metallic effect of the UV metallic ink or the UV metallic coating material.

The invention claimed is:

1. A metallic pigment composition for preparing a UV metallic composition, wherein
    said metallic pigment composition contains a metal flake and a nitrocellulose at a ratio in a range of the nitrocellulose 0.1 to 12 parts by mass to the metal flake 100 parts by mass,
    the nitrocellulose has an average polymerization degree in a range of 30 to 150 and a content of nitrogen atom in a range of 10.7 to 12.2% by mass,
    at least a portion of said nitrocellulose adsorbs on said metal flake, and
    said UV metallic composition is a UV metallic ink composition or a UV metallic coating material composition.

2. The metallic pigment composition according to claim 1, wherein a surface of the metal flake was coated with a phosphorus compound.

3. The metallic pigment composition according to claim 1, wherein a diluent for dissolving the nitrocellulose is 2-hydroxy-3-phenyloxypropyl acrylate.

4. A UV metallic ink composition comprising the metallic pigment composition according to any one of claims 1 to 3.

5. A UV metallic coating material composition comprising the metallic pigment composition according to any one of claims 1 to 3.

* * * * *